US008719916B2

(12) United States Patent
Kim

(10) Patent No.: US 8,719,916 B2
(45) Date of Patent: May 6, 2014

(54) METHOD AND APPARATUS FOR CONTROLLING LOADS OF A PACKET INSPECTION APPARATUS

(75) Inventor: Hyong-Shik Kim, Daejeon (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 0 days.

(21) Appl. No.: 13/339,507

(22) Filed: Dec. 29, 2011

(65) Prior Publication Data
US 2012/0102563 A1    Apr. 26, 2012

Related U.S. Application Data

(63) Continuation of application No. PCT/KR2009/003693, filed on Jul. 7, 2009.

(30) Foreign Application Priority Data

Jul. 2, 2009   (KR) ................ 10-2009-0060201

(51) Int. Cl.
*H04L 29/06*   (2006.01)

(52) U.S. Cl.
USPC ........................................... 726/13

(58) Field of Classification Search
None
See application file for complete search history.

(56) References Cited

U.S. PATENT DOCUMENTS

| 7,372,809 B2 * | 5/2008 | Chen et al. ............. 370/229 |
| 7,426,634 B2 * | 9/2008 | Jain ....................... 713/151 |
| 7,624,436 B2 * | 11/2009 | Balakrishnan et al. .... 726/13 |
| 7,681,235 B2 * | 3/2010 | Chesla et al. ............ 726/23 |
| 8,000,244 B1 * | 8/2011 | Canion et al. ........... 370/235 |
| 2004/0162992 A1 * | 8/2004 | Sami et al. .............. 713/200 |
| 2004/0215976 A1 * | 10/2004 | Jain ....................... 713/201 |

(Continued)

FOREIGN PATENT DOCUMENTS

| KR | 10-2003-0059204 | 7/2003 |
| KR | 10-2004-0074367 | 8/2004 |
| KR | 10-2005-0010896 | 1/2005 |
| KR | 10-2009-0044177 | 5/2009 |

OTHER PUBLICATIONS

ICCE.org International Conference on Consumer Electronics, 2009 ICCE Detailed Conference Schedule, "Enhancing Survivability of Internet Appliances Using an On-the-fly Packet Filtering Method".

*Primary Examiner* — Jeffery Williams
(74) *Attorney, Agent, or Firm* — Edwards Wildman Palmer LLP; Kongsik Kim; Jonathon P. Western

(57) ABSTRACT

The present invention periodically monitors the amount of packets flowing into a packet inspection apparatus, i.e., a load level, and compares the load level with a predetermined upper or lower limit value. Accordingly, the present invention blocks some of the packets or passes along some of the packets through the packet inspection apparatus when the load level exceeds a certain level, and thus the load controlling method and apparatus guarantees continuous operation of the packet inspection apparatus even in an overloaded state. In addition, the load controlling method and apparatus according to the present invention effectively selects packets to be blocked or passed without departing from the original functions of the packet inspection apparatus. The load controlling method and apparatus is configured simply so as not to additionally induce a load in the process of selection, and the load controlling apparatus selectively operates only in an overloaded state.

4 Claims, 5 Drawing Sheets

(56) References Cited

U.S. PATENT DOCUMENTS

| | | | |
|---|---|---|---|
| 2004/0250124 A1* | 12/2004 | Chesla et al. | 713/201 |
| 2006/0072582 A1* | 4/2006 | Bronnimann et al. | 370/395.32 |
| 2006/0133377 A1* | 6/2006 | Jain | 370/392 |
| 2006/0146816 A1* | 7/2006 | Jain | 370/389 |
| 2006/0268866 A1* | 11/2006 | Lok | 370/389 |
| 2008/0201772 A1* | 8/2008 | Mondaeev et al. | 726/13 |
| 2010/0158009 A1* | 6/2010 | Lee et al. | 370/392 |
| 2012/0263071 A1* | 10/2012 | Keynan et al. | 370/252 |

* cited by examiner

METHOD AND APPARATUS FOR CONTROLLING LOADS OF A PACKET INSPECTION APPARATUS

CROSS-REFERENCES TO RELATED APPLICATION

This is a continuation of International Application No. PCT/KR2009/003693, with an international filing date of Jul. 7, 2009, which claims the benefit of Korean Application No. 10-2009-0060201 filed Jul. 2, 2009, the entire contents of which are incorporated herein by reference.

TECHNICAL FIELD

The present invention relates to a method and apparatus for controlling loads of a packet inspection apparatus in order to improve survivability of a system against denial-of-service (DoS) attacks, and more specifically, to a method of preventing the packet inspection apparatus from being overloaded so as not to exceed a certain level, in which when a large amount of packets flow in the packet inspection apparatus due to the DoS attacks, first, the packets are classified based on simple criteria before being transferred to the packet inspection apparatus, and some of the classified packets are blocked or pass through the existing packet inspection apparatus so that loads of the packet inspection apparatus may not exceed a certain level.

BACKGROUND ART

DoS attacks are divided into Distributed DoS (DDoS) attacks launched by a plurality of "zombie systems" and attacks launched by a single system making use of vulnerabilities of the Internet protocols or system. The DDoS attacks launched by a plurality of zombie computers are a type of attack made by the plurality of zombie systems to a single system. The DDoS attacks may be made through normal service requests without making use of the vulnerabilities. Recently, attacks using such normal service requests have been increasing, and thus packet inspection apparatuses (system security apparatuses) suffer from difficulties in separating malicious service requests from normal service requests.

Conventionally, in order to detect the DoS attacks, packets are inspected by comparing the packets with rules one by one, and thus the inspection process can be quite complicated. The rules used for inspecting the packets are divided into rules of inspecting packet headers and rules of inspecting packet contents, i.e., payloads. Generally, a process applying the rules of inspecting payloads is even more complicated due to its complex nature. For example, in order to execute a rule which defines a packet as an attack if a character string 'attack' is contained in the payload, the entire payload should be sequentially inspected to determine whether or not the character string 'attack' exists. Therefore, the longer the payload is and the more the number of inspection rules to apply, the more complicated the inspection process is. Accordingly, if a large amount of packets flow into the system at one time due to a DoS attack, the time for processing normal packets is extended, and thus an inverse effect of increasing the effect of attack may occur.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Therefore, the present invention has been made to compensate for weak points of the conventional packet inspection apparatus (a system security apparatus) described above, and it is an object of the present invention to provide a method and apparatus for decreasing loads substantially processed by the packet inspection apparatus, preventing system operation interruption caused by DoS attacks, improving survivability of the system, and reducing service waiting time of normal packets, while maintaining functionality of the system including the packet inspection apparatus, by controlling the amount of packets flowing into the packet inspection apparatus in advance when the system is overloaded in a method of classifying the packets into packets to be blocked and packets not to be inspected.

The conventional packet inspection apparatus has constraints in the number of packets that can be processed due to a full packet inspection processed which is performed when a large amount of packets flow into the apparatus at one time. At this point, packets that cannot be processed are arbitrarily discarded, and in some cases the operation of the packet inspection apparatus is stopped.

The method and apparatus according to the present invention for achieving the above objects relates to a load controlling method repeatedly performing the steps of: (A) measuring the amount of packets flowing into a packet inspection apparatus and comparing the amount of packets with an upper limit value or a lower limit value; and (B) i., transferring the flow-in packets to the packet inspection apparatus without operating a load controlling apparatus if the flow-in amount is less than the upper limit value, and ii., determining whether each of the packets is to be blocked or passed along using only header information when the amount of the flow-in packets exceeds the upper limit value, discarding the packet when the packet is determined to be blocked, passing the packet through the packet inspection apparatus when the packet is determined to be passed, and transferring the packet to the packet inspection apparatus otherwise.

Since the method of determining whether a packet is to be blocked or passed in step (B) of the present invention is very simple in that only packet headers are used, compared with general methods of inspecting all of the contents of a packet, the method is appropriate to be used as a preemptive process before transferring packets to the packet inspection apparatus. Furthermore, since values generated from the information extracted from the packet header are used, the process of determining whether a packet is to be blocked or passed is less complicated than the process required in the convention methods.

In addition, in step (B) of the present invention, it is preferable that magnitude of blocking and passing threshold values for determining whether a packet is to be blocked or passed is controlled in association with flow-in loads, i.e., through a feedback, since the amount of flow-in packets fluidly changes, whereas the amount of packets that can be processed by the packet inspection apparatus is constant.

When the present invention is preemptively applied before the existing packet inspection apparatus, overload invited by packet inspection is prevented, and the effects of DoS attacks may be mitigated, while using the conventional packet inspection apparatus as is. Since overall loads of the system are reduced thereby, survivability of the system can be improved. Furthermore, according to the present invention, packets passing through the packet inspection apparatus without being inspected do not have a delay time introduced by the inspection, and thus service waiting time is reduced.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE DISCLOSURE

Figure 1:
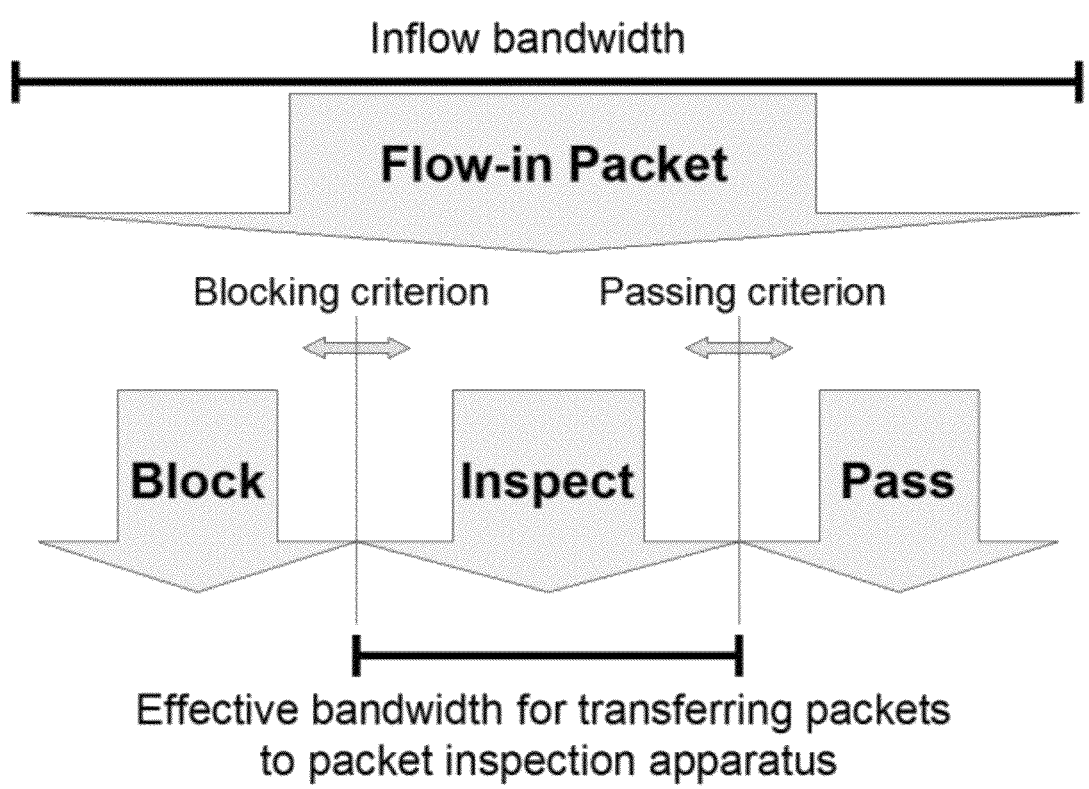
FIG. 1 is a conceptual view graphically showing classification of flow-in packets in a load controlling process according to the present invention.

The present invention has been made to control the amount of loads of packets flowing into the packet inspection apparatus. From the viewpoint of packet flow, the load controlling apparatus according to the present invention is installed in front of an existing packet inspection apparatus, and the load controlling apparatus selectively operates only when overload of the existing packet inspection apparatus is suspected. That is, the load controlling apparatus operates only when the loads applied to the packet inspection apparatus are excessively large, and otherwise, the load controlling apparatus transfers all packets to the packet inspection apparatus as they are.

The present invention classifies packets into suspected packets and safe packets based on easily recognizable criteria when the load on the system increases, and some of the packets classified as such are blocked so as not to arrive at the packet inspection apparatus or passed along so as not to be inspected by the existing packet inspection apparatus. Therefore, magnitude of the loads applied to the packet inspection apparatus is controlled so as not to exceed a certain range. As a result, survivability of the system is improved, and service waiting time of normal packets is reduced.

In an exemplary embodiment of the present invention, the number of packets per second (PPS) is used in order to measure the magnitude of loads flowing into the packet inspection apparatus. Hereinafter, the amount of all packets flowing into the load controlling apparatus is referred to as an 'inflow packet amount $PPS_{in}$', the amount of packets transferred to the existing packet inspection apparatus via the load controlling apparatus as a 'load packet amount $PPS_{load}$' the maximum amount of packets that can be processed by the existing packet inspection apparatus as '$PPS_{high}$', the amount of packets that is sufficiently small so as not to need to separate and restrict abnormal packets as '$PPS_{low}$', the amount of packets determined to be harmful and blocked as a 'blocked packet amount $PPS_{block}$', and the amount of packets determined to be harmless and passed without being inspected by the packet inspection apparatus as a 'passed packet amount $PPS_{bypass}$'.

When the load controlling apparatus of the present invention is not installed, $PPS_{load}$ of the packet inspection apparatus is equal to $PPS_{in}$. That is, all the packets flowing into the load controlling apparatus are transferred to the packet inspection apparatus as they are. When overload of the packet inspection apparatus is anticipated, i.e., it is measured such that $PPS_{in}>PPS_{high}$, the load controlling apparatus starts to operate and lowers the $PPS_{load}$ to be less than $PPS_{high}$, and thus, the load on the packet inspection apparatus is lowered. When the overload state of the packet inspection apparatus is resolved, i.e., when $PPS_{load}$ is less than $PPS_{low}$, operation of the load controlling apparatus is terminated/stopped, and thus the $PPS_{load}$ becomes equal to $PPS_{in}$ again.

The present invention will be hereafter described in detail, with reference to the accompanying drawings. The accompanying drawings relate to an apparatus capable of performing the load controlling process according to the present invention, i.e., the load controlling apparatus. Assuming an exemplary apparatus, the load controlling process according to the present invention will be described in detail. However, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled.

In the present invention, 'potential harmfulness' or 'potential harmlessness' means that a packet is initially analyzed based on easily recognizable criteria using only header information of the packet before a full inspection (normal inspection) is performed by the packet inspection apparatus, and as a result of the analysis, the apparatus determines whether the packet is 'highly probable to be determined as being harmful or harmless in the full inspection'.

FIG. 1 is a conceptual view graphically showing the process of classifying flow-in packets based on certain criteria, blocking some of the packets, passing along some of the packets, and transferring the other packets to the packet inspection apparatus and fully inspecting the transferred packets according to the present invention.

When a DoS attack occurs (more specifically, when packets of an amount larger than the maximum packet processing amount of the packet inspection apparatus flow-in), potential harmfulness is examined on the packets corresponding to $PPS_{in}$ based on easily recognizable criteria, and the packets are classified based on the result of the examination. Packets determined as being potentially harmful are blocked, and packet determined as being harmless pass through the packet inspection apparatus. The other packets, i.e., packets on which determination of their harmfulness or harmlessness is suspended, are transferred to the existing packet inspection apparatus to be fully inspected, and the criteria for determining the potential harmfulness or harmlessness is dynamically changed so that the amount of the packets transferred to the existing packet inspection apparatus does not exceed $PPS_{high}$. At this point, the criteria for determining the potential harmfulness or harmlessness will be a blocking threshold value or a passing threshold value, and thus the criteria for determining the potential harmfulness or harmlessness can be changed by changing the threshold values.

The blocking and passing threshold values are criteria for determining potential harmfulness or harmlessness. It is preferable to minimize the amount of packets corresponding to the potentially harmfulness or harmlessness since the object of the load controlling process and apparatus according to the present invention is to filter some of the packets in advance before they reach the existing packet inspection apparatus.

The method proposed in the present invention dynamically adjusts the blocking and passing threshold values as shown below in order to achieve the object.

When the load controlling apparatus starts to operate, it initializes the blocking and passing threshold values with predetermined values. When the amount of the packets transferred to the packet inspection apparatus from the load controlling apparatus, i.e., $PPS_{load}$, is still greater than $PPS_{high}$, the load controlling apparatus adjusts $PPS_{load}$ to be decreased by changing the blocking and passing threshold values. On the other hand, when $PPS_{load}$ is decreased to be less than $PPS_{high}$, the load controlling apparatus adjusts $PPS_{load}$ to be increased by changing the blocking and passing along threshold values. In this manner, the load controlling apparatus minimizes unnecessarily blocked or passed packets. That is, the load controlling apparatus is fed back with $PPS_{load}$ and compares the load with the $PPS_{high}$, and the $PPS_{load}$ is controlled to maintain a largest possible value, while still being less than $PPS_{high}$, based on the result of the comparison.

At this point, the potential harmfulness and harmlessness of the packets are detected based on packet header information. This determination process is fairly simple so there is short processing time. Features outstanding in the DoS attack may be used to determine the potential harmfulness, and features inconspicuous in the DoS attack may be used to determine the potential harmlessness.

An example of the process for determining potential harmfulness is as shown below. The level of concentration of packets at the transmitter and the receiver is quantified using information on the source IP address and the destination IP address extracted from the packet header. In a situation where denial of service is derived by attacking a specific host, destination IP addresses will be focused on a specific address. Accordingly, whenever a packet is received, potential harmfulness of the packet can be determined by extracting the destination IP address, quantifying concentrativeness of the destination IP address in a unit time, and estimating possibility of DoS attack using information on the concentrativeness. On the other hand, concentrativeness of the source IP address is quantified for the packets that have passed the potential harmfulness test, i.e., the packets determined as not being harmful, and packets transmitted from a source of high concentrativeness are determined as being potentially harmless. It is since that a transmitter repeated after the harmful packets are discarded may be naturally regarded as transmitting a large amount of packets due to a network error or need of service.

Figure 2:
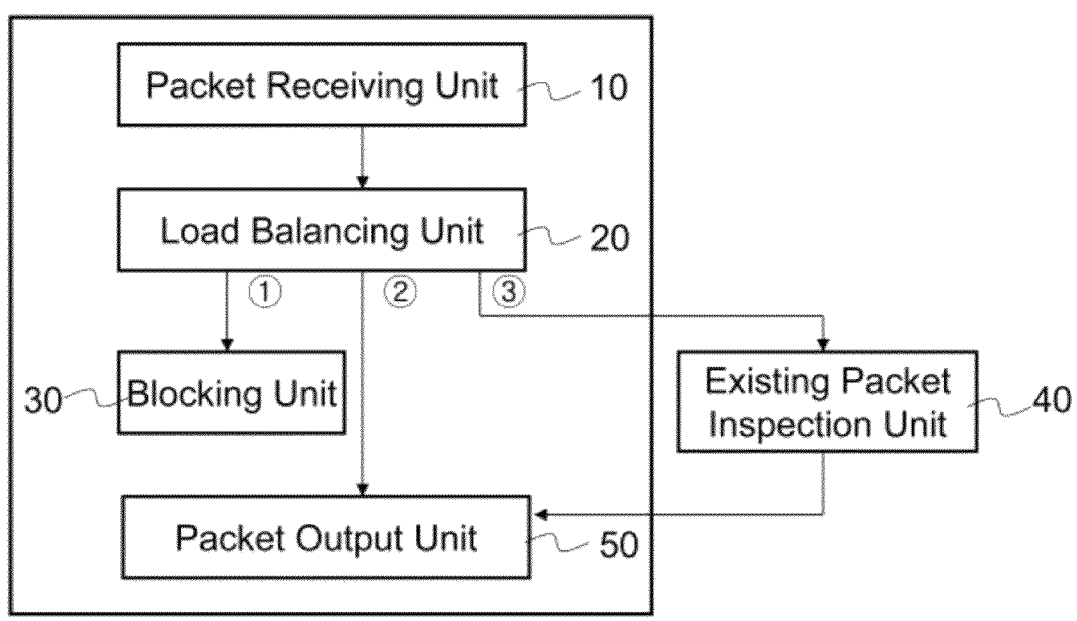
FIG. 2 is a conceptual view showing a system in which a load controlling unit for performing a load controlling process according to the present invention is added to a conventional system for preventing DoS attacks.

FIG. 2 is a conceptual view showing a system in which a load controlling unit 20 for performing a load controlling process according to the present invention is added to a conventional packet inspection apparatus for preventing DoS attacks. Packets flowing in through a packet receiving unit 10 flow out through a packet output unit 50. By adding the load controlling unit 20 performing the present invention in front of the packet inspection apparatus used in the conventional method (a method of fully inspecting all flow-in packets one by one), the load controlling unit 20 blocks or passes some of the packets or sends packets to the existing packet inspection apparatus within a range of packet amounts that can be processed by the existing packet inspection apparatus, when the amount of the flow-in packets exceeds a certain level. The existing packet inspection apparatus 40 fully inspects the packets in a general process and blocks only the packets determined as being harmful. All the packets transferred to a blocking unit 30 are discarded. Such a function does not need to be physically independent and may be one of detailed functions of the load controlling unit 20.

Figure 3:
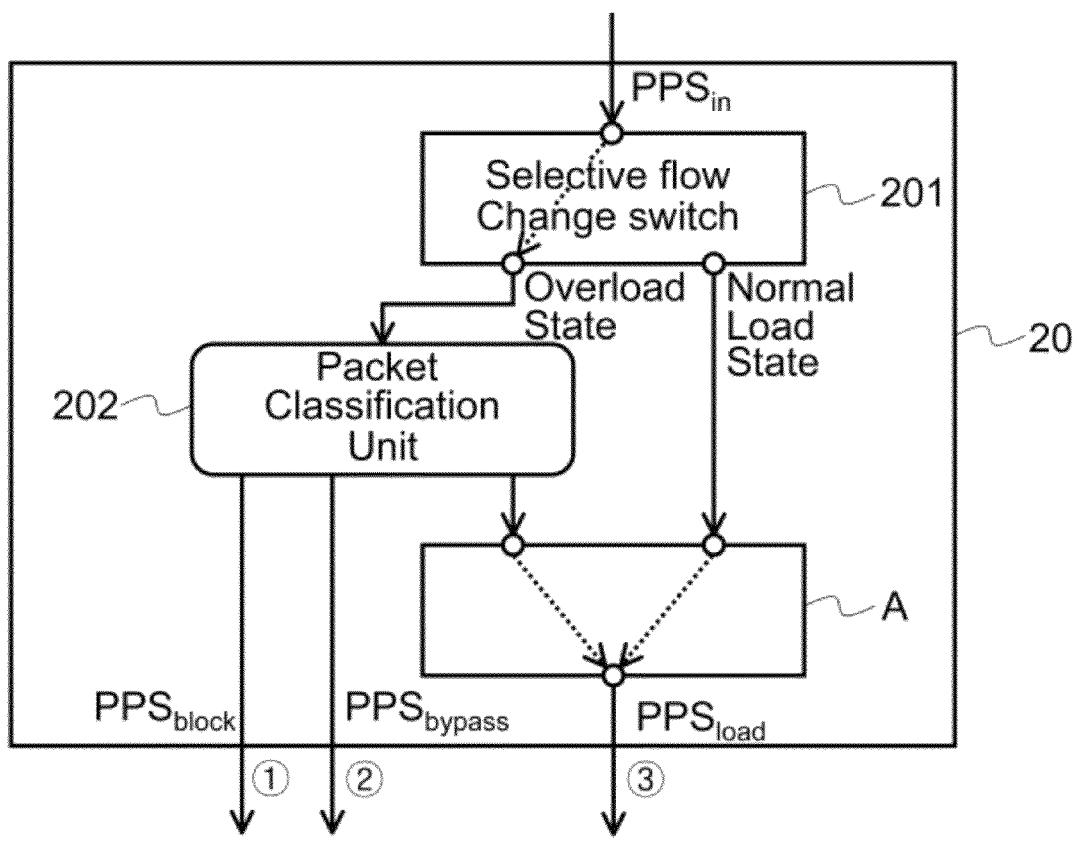
FIG. 3 is a conceptual view showing a functional structure of the load controlling unit in detail.

FIG. 3 is a conceptual view showing a functional structure of the load controlling unit 20 in detail. The load controlling unit 20 may include a selective flow change switch 201 for measuring current loads of the system and changing flow of packets, and a packet classification unit 202 for lowering loads of the packet inspection apparatus by controlling the amount of packets depending on the loads of the existing packet inspection apparatus 40.

The selective flow change switch 201 sends packets to the packet classification unit 202 when the system is in an overload state and sends packets to the existing packet inspection apparatus 40 when the system is in a normal load state. The packet classification unit 202 classifies the packets into i., packets to be blocked using a blocking threshold value and a passing threshold value, ii., packets to be passed through the existing packet inspection apparatus 40, and iii., packets to be fully inspected by the existing packet inspection apparatus 40. The packets sent to the existing packet inspection apparatus 40 by the packet classification unit 202 are transferred to the existing packet inspection apparatus 40 together with all the packets of a normal load state transferred by the selective flow change switch 201.

In FIG. 3, unit A aggregates these two type of packets, however, this is for $PPS_{bypass}$ exemplary purposes only. Furthermore, $PPS_{in}$, $PPS_{block}$, and $PPS_{bypass}$ and $PPS_{load}$ representing the amounts of packets in the flow-in packet path and the flow-out packet paths are additionally shown for the convenience of understanding.

Figure 4:
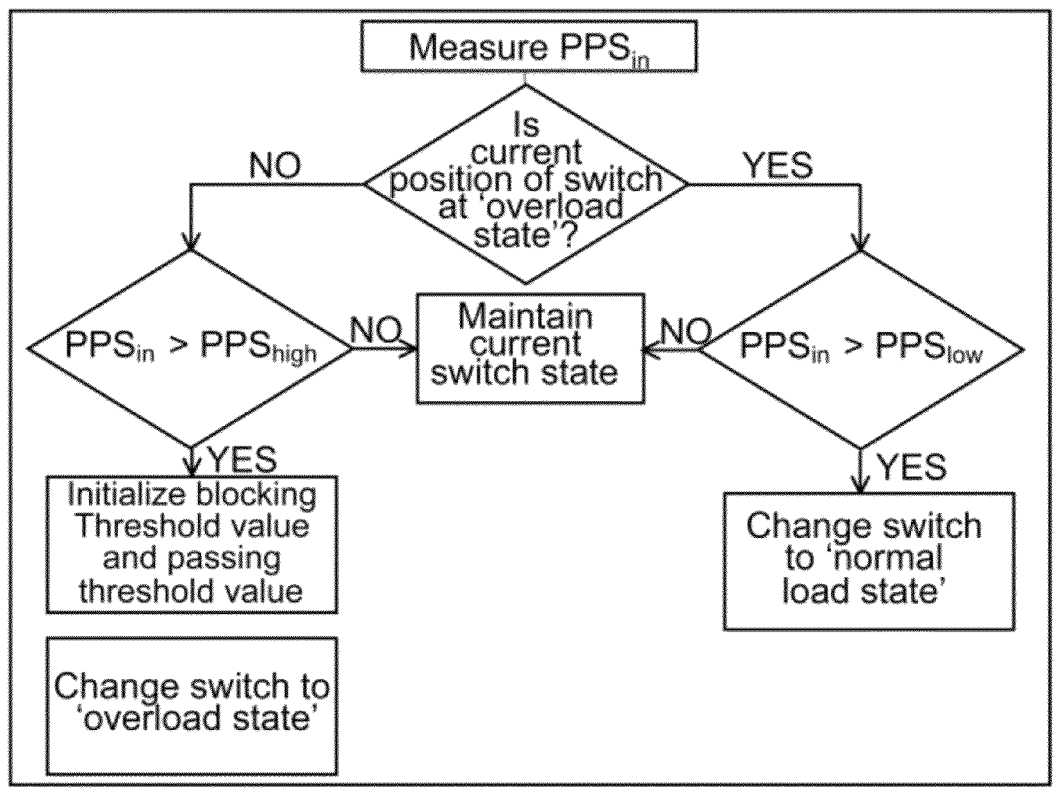
FIG. 4 is a flowchart illustrating the operation of a selective flow change switch.

FIG. 4 is an exemplary flowchart illustrating the operation of a selective flow change switch 201 mentioned in FIGS. 2 and 3. The selective flow change switch 201 measures $PPS_{in}$, compares $PPS_{in}$ with $PPS_{high}$ or $PPS_{low}$ with reference to the current overload state, and then changes the state of the switch when needed. That is, when the current position of the selective flow change switch 201 is the 'overload state' and $PPS_{in}$ goes below $PPS_{low}$, the switch is changed to the 'normal load state'. When the current position of the selective flow change switch 201 is the 'normal load state' and $PPS_{in}$ goes above $PPS_{high}$, the switch is changed to the 'overload state'.

When the switch is changed to the 'overload state', the blocking and passing threshold values used by the packet classification unit 202 are initialized. Values that can sufficiently decrease the amount of packets transferred to the packet inspection apparatus are selected as initial values of the blocking and passing thresholds.

Figure 5:
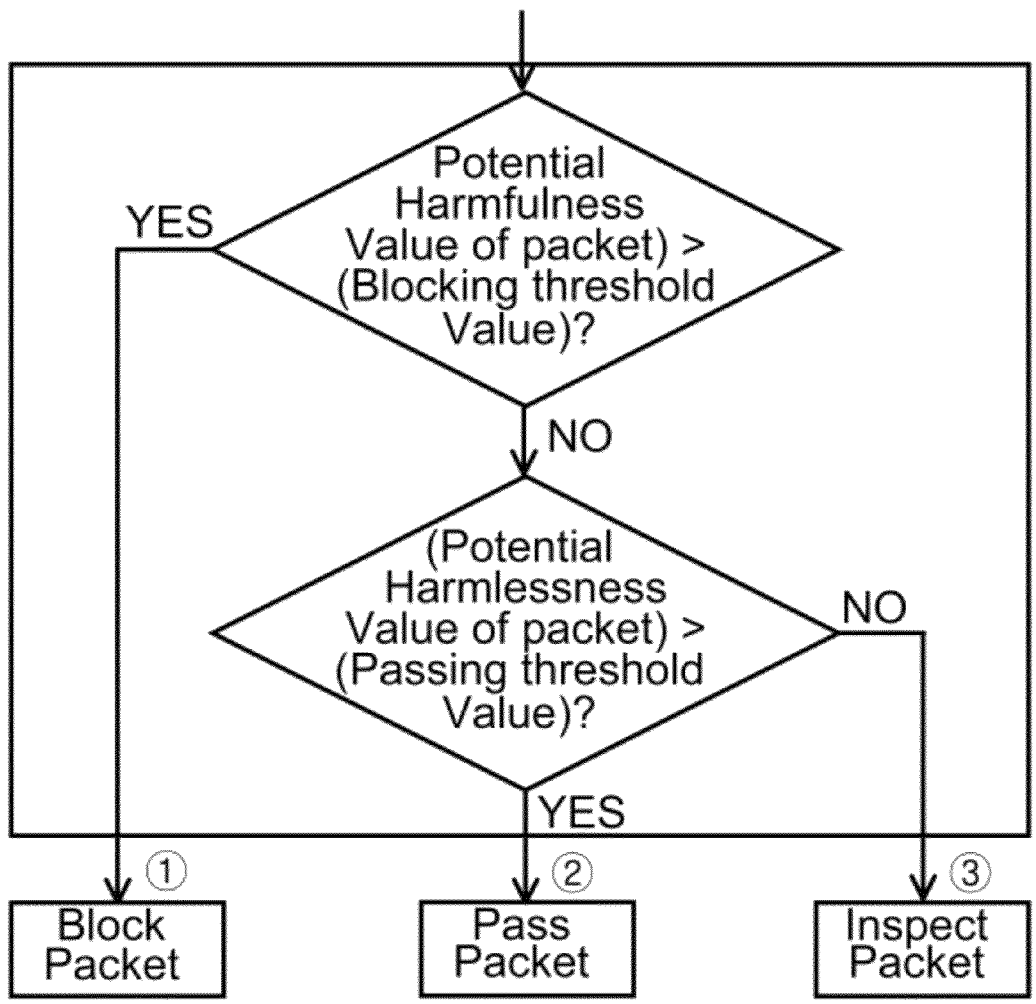
FIG. 5 is a flowchart illustrating the operation of a packet classification unit.

FIG. 5 is an exemplary flowchart illustrating the operation of the packet classification unit 202. The packet classification unit 202 'blocks' a packet when 'a potential harmfulness value of the packet' calculated from the packet header is larger than the blocking threshold value and 'passes' the packet when 'a potential harmlessness value of the packet' is larger than the passing threshold value. Only the packets that do not correspond to the two cases are transferred to and 'inspected' by the packet inspection apparatus 40. For the convenience of understanding, i. ii., and iii. of FIG. 5 are shown to correspond to i., ii., and iii. of FIG. 3.

Meanwhile, the load controlling unit 20 has a function for dynamically changing the blocking and passing threshold values so that the packet classification unit 202 may operate efficiently. The amount of the packets $PPS_{load}$ transferred to the packet inspection apparatus 40 is fed back into the load control unit 20 and compared with $PPS_{high}$, and then the blocking and passing threshold values should be organically changed so as to be the largest possible value within a range where $PPS_{high}$ does not exceed $PPS_{load}$. Fundamentally, the blocking and passing threshold values are the number of packets at any instant in time. As describe above, packets are suspected as being DoS attacks when a source IP address is repeated, and thus corresponding packets need to be blocked. The blocking threshold value is a value indicating a level of repetition of packets needed for blocking the packets, and in the same manner, the passing threshold value is a value indicating a level of repetition of packets needed for passing the packets. A formula for dynamically changing the blocking and passing threshold values is as shown below.

$$Th_{new} = \alpha \cdot \gamma \cdot Th_{old} + (1-\alpha) Th_{old}$$

$Th_{old}$ and $Th_{new}$ represent threshold values before and after change, and $\gamma$ is a coefficient for changing the threshold values. A method for calculating $\gamma$ is calculating a ratio of $PPS_{high}$ to $PPS_{load}$, i.e., $$\frac{PPS_{high}}{PPS_{load}}.$$

When $PPS_{high}$ is greater than $PPS_{load}$, $\gamma$ is greater than 1, and thus the threshold value increases, which means that the possibility of determining a packet to be blocked or passed is lowered (the packet is blocked or passed only when $PPS_{load}$ is greater than the threshold value). Although the value of $PPS_{load}$ should be less than $PPS_{high}$, the largest possible value should be selected, and thus there is an effect of increasing $PPS_{load}$. On the other hand, when $PPS_{high}$ is less than $PPS_{load}$, i.e., the system is in an overloaded state, $\gamma$ is less than 1, and thus the threshold value decreases. Therefore, the number of packets to be blocked or passed increases, and thus $PPS_{load}$, which is a load applied to the packet inspection apparatus, is decreased.

$\alpha$ is for adjusting a degree indicating how promptly a threshold value is changed. When $\alpha$ is 1, it means that a threshold value $Th_{old}$ before the change is directly changed to a threshold value $\gamma \cdot Th_{old}$ after the change. However, since a degree of reflecting a new threshold value decreases as $\alpha$ approaches 0, the threshold value gradually changes. When $\alpha$ is larger, although the load can be controlled in a short time period, a kind of vibration appears in the process of converging on an appropriate threshold value. On the other hand, when $\alpha$ is the smaller, although a time required to deal with a case where the amount of applied loads abruptly increases or decreases is extended further longer, the function of controlling overall loads is improved.

Meanwhile, in addition to the source IP address and the destination IP address described above, other information that can be obtained from the packet header, such as length of a packet or the like, may be used as a criterion for determining potential harmfulness and harmlessness. Since the length of a packet which induces a DoS attack is generally short, it is possible to use the length of a packet as a threshold value and conjecture that a packet longer than the threshold value is potentially harmless. That is, when the number of packets that should be determined as being potentially harmless needs to be increased, the threshold value should be lowered so that further more packets can be determined as being potentially harmless. In the opposite case, the number of packets determined as being harmless is decreased by increasing the threshold value.

Furthermore, the present invention may be embodied as non-transitory computer readable media on a computer readable medium containing executable program instructions executed by a control unit made up of a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

Since the load controlling process and apparatus of the present invention classifies packets in advance before the packets flow into the existing packet inspection apparatus, and blocks the classified packets or passes the packets through the packet inspection apparatus, overload invited by the packet inspection is prevented, and effects of DoS attacks can be mitigated. Furthermore, since packets passing through the packet inspection apparatus without being inspected do not have a delay time introduced by the inspection, service waiting time can be reduced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A load controlling method comprising:
repeatedly performing the steps of:
(A) measuring an amount of packets flowing into a packet inspection apparatus and determining whether the measured amount exceeds a predetermined amount that the packet inspection apparatus can inspect; and
(B) transferring all flow-in packets to the packet inspection apparatus, if it is determined that the measured amount does not exceed the predetermined amount;
(C-1) extracting a source IP address and a destination IP address from the header of each of the packets;
(C-2) measuring concentrativeness values on the source IP address and on the destination IP address accumulated in a unit time with respect to each of the packets;
(C-3) determining each of the packets as being potentially harmful when the measured concentrativeness value on the destination IP address is larger than a blocking threshold value or as being potentially harmless when the measured concentrativeness value on the source IP address is larger than a passing threshold value; and
(C-4) blocking, by a load controlling unit, packets determined as being potentially harmful, or passing packets determined as being potentially harmless to a packet output unit, or transferring the rest of the packets to the packet inspection apparatus, if it is determined that the measured amount exceeds the predetermined amount,
wherein the load controlling unit uses only information contained in the header of each of the packets to determine which packet is blocked or passed.

2. The method according to claim 1, wherein the amount of the packets transferred to the packet inspection apparatus is fed back into a load control unit to dynamically change the blocking threshold value and the passing threshold value, so that a load level of the packet inspection apparatus is maintained to be largest possible but less than a certain level.

3. A non-transitory computer readable medium containing program instructions executed by a processor or controller, the computer readable medium comprising:
program instructions that repeatedly performing the steps of:
(A) measuring an amount of packets flowing into a packet inspection apparatus and determining whether the measured amount exceeds a predetermined amount that the packet inspection apparatus can inspect; and (B) transferring all flow-in packets to the packet inspection apparatus, if it is determined that the measured amount does not exceed the predetermined value;

(C-1) extracting a source IP address and a destination IP address from the header of each of the packets;

(C-2) measuring concentrativeness values on the source IP address and on the destination IP address accumulated in a unit time with respect to each of the packets;

(C-3) determining each of the packets as being potentially harmful when the measured concentrativeness value on the destination IP address is larger than a blocking threshold value or as being potentially harmless when the measured concentrativeness value on the source IP address is larger than a passing threshold value; and (C-4) blocking, by a load controlling unit, packets determined as being potentially harmful, or passing packets determined as being potentially harmless to a packet output unit, or transferring the rest of the packets to the packet inspection apparatus, if it is determined that the measured amount exceeds the predetermined amount, wherein the load controlling unit uses only information contained in the header of each of the packets to determine which packet is blocked or passed.

4. The non-transitory computer readable medium according to claim 3, wherein the amount of the packets transferred to the packet inspection apparatus is fed back into a load control unit to dynamically change the blocking threshold value and the passing threshold value, so that a load level of the packet inspection apparatus is maintained to be largest possible but less than a certain level.

* * * * *